United States Patent
Lo et al.

(10) Patent No.: US 7,821,699 B1
(45) Date of Patent: Oct. 26, 2010

(54) ELECTROWETTING DISPLAY AND METHOD FOR FABRICATING THE SAME

(75) Inventors: Kuo-Lung Lo, Taipei County (TW); Wei-Yuan Cheng, Taipei County (TW); Hsin-Hung Lee, Taipei County (TW); Yu-Hsiang Tsai, Changhua County (TW); Shu-Wei Kuo, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/651,880

(22) Filed: Jan. 4, 2010

(30) Foreign Application Priority Data

Jun. 10, 2009 (TW) .............................. 98119343 A

(51) Int. Cl.
*G02B 26/00* (2006.01)
*G02F 1/03* (2006.01)
*G02F 1/01* (2006.01)

(52) U.S. Cl. ........................ 359/290; 359/244; 359/276

(58) Field of Classification Search ......... 359/290–293, 359/295, 223–225, 243, 260–263, 298, 198, 359/301–303, 315–318, 237, 242, 253, 276, 359/238, 245, 259, 244
See application file for complete search history.

(56) References Cited

U.S. PATENT DOCUMENTS

| | | | |
|---|---|---|---|
| 7,675,665 B2* | 3/2010 | Hagood et al. .............. 359/233 |
| 7,695,648 B2* | 4/2010 | Winscom et al. ............ 252/512 |
| 2005/0128370 A1* | 6/2005 | Moon ........................... 349/32 |
| 2005/0151709 A1 | 7/2005 | Jacobson et al. |
| 2006/0132927 A1 | 6/2006 | Yoon |
| 2006/0285067 A1 | 12/2006 | Kim |
| 2007/0031097 A1* | 2/2007 | Heikenfeld et al. ......... 385/129 |
| 2007/0146242 A1* | 6/2007 | Miller et al. .................. 345/76 |
| 2007/0205979 A1* | 9/2007 | Bigelow et al. ............. 345/107 |
| 2009/0103159 A1* | 4/2009 | Cheng et al. ................ 359/228 |

FOREIGN PATENT DOCUMENTS

| WO | WO-2004/104670 A1 | 12/2004 |
|---|---|---|
| WO | WO-2005/098524 A1 | 10/2005 |
| WO | WO-2006/017129 A1 | 2/2006 |

\* cited by examiner

*Primary Examiner*—Scott J Sugarman
*Assistant Examiner*—Dawayne A Pinkney
(74) *Attorney, Agent, or Firm*—Birch, Stewart, Kolasch & Birch, LLP

(57) ABSTRACT

The invention provides an electrowetting display and a method for fabricating the same. The electrowetting display comprises a first electrode formed on a first substrate. A dielectric layer is formed on the first electrode. A plurality of ribs are formed on the dielectric layer. A hydrophobic layer is formed on the dielectric layer and between the ribs. A second substrate is disposed oppositely to the first substrate. A second electrode is formed on the second substrate. A plurality of supporting members are formed on the second electrode and aligned to the ribs to form an enclosed space. A polar solution and a non-polar solution are disposed in the enclosed space.

36 Claims, 9 Drawing Sheets

ELECTROWETTING DISPLAY AND METHOD FOR FABRICATING THE SAME

CROSS REFERENCE TO RELATED APPLICATIONS

This Application claims priority of Taiwan Patent Application No. 098119343, filed on Jun. 10, 2009, the entirety of which is incorporated by reference herein.

BACKGROUND OF THE INVENTION

1. Field of the Invention

The present invention relates to a display, and in particular relates to an electrowetting display and a method for fabricating the same.

2. Description of the Related Art

Along with developments in photoelectric techniques, electrowetting displays have been disclosed, having high contrast ratio, fast response time, low power consumption and high resolution characteristics.

The Liquavista Company manufactures an electrowetting display. The electrowetting display comprises a substrate, a non-polar oil, a polar solution, a hydrophobic layer, and a hydrophilic rib, wherein the hydrophobic layer is formed on the substrate, the non-polar oil is formed on the hydrophobic layer and separated by the hydrophilic rib, and the polar solution is disposed on the non-polar oil. Operation of the electrowetting display is as follow. When no voltage is applied to the display, the non-polar oil is formed on the hydrophobic layer, so that the color displayed is that of the non-polar oil. When a voltage is applied to the display, the polar solution is attracted by the induced charges formed on hydrophobic layer, and the non-polar oil moves to one corner of the substrate, so that the color of the substrate is displayed.

European publication NO. WO 2005098524 provides an electrowetting display, wherein the display comprises a polar solution, oil, an upper substrate and a lower substrate. However, the oil is only separated by the ribs, thus an oil overflow problem sometimes occur.

US publication NO. 20060285067 disclose an electrowetting display, wherein closed structures are formed with large height (high aspect ratio) ribs. However, the high aspect ratio ribs results in a more complex fabrication process.

US publication NO. 20050151709 disclose an electrowetting display, wherein the ribs have an upper portion and a lower portion. The lower portion ribs are hydrophobic to help oil flow, and the upper portion ribs are hydrophilic to prevent the problem of oil overflow.

In general, the hydrophilic ribs are often formed on the hydrophobic structures. Thus, a adhesion problem of ribs occur and large area fabrication is difficult due to the large polarity difference between the ribs and the hydrophobic structures. Additionally, the problem of oil overflow is difficult to mitigate due to the poor hydrophilic character of the surface of hydrophilic ribs made of resin.

Thus, there is a need to develop an electrowetting display with improved ribs adhesion, mitigating the oil overflow problem.

BRIEF SUMMARY OF THE INVENTION

The invention provides an electrowetting display, comprising: a first substrate; a first electrode formed on the first substrate; a dielectric layer formed on the first electrode; a plurality of ribs formed on the dielectric layer; a hydrophobic layer formed on the dielectric layer and between the ribs; a second substrate disposed oppositely to the first substrate; a second electrode formed on the second substrate; a plurality of supporting members formed on the second electrode and aligned to the ribs to form an enclosed space; and a polar solution and a non-polar solution disposed in the enclosed space.

The invention also provides a method for fabricating an electrowetting display, comprising: providing a first substrate; forming a first electrode on the first substrate; forming a dielectric layer on the first substrate; forming a plurality of ribs directly on the dielectric layer; forming a hydrophobic layer on the dielectric layer and between the ribs; introducing a non-polar solution between the ribs; providing a second substrate; forming a second electrode on the second substrate; forming a plurality of supporting members on the second substrate; introducing a polar solution between the first substrate and the second substrate; and combining the first substrate and the second substrate such that the ribs are aligned to the supporting members to form an enclosed space.

A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
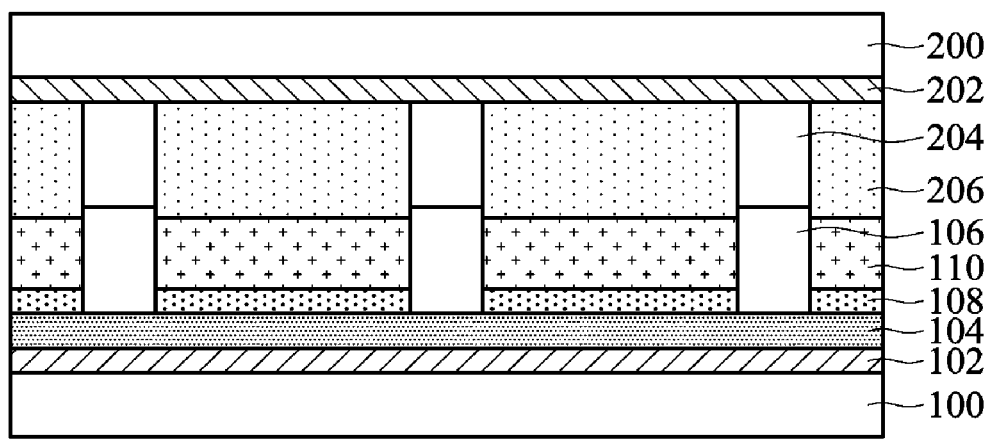
FIG. 1 shows a cross-sectional schematic representation of an electrowetting display in accordance with a first embodiment of the invention.

Referring to FIG. 1, the electrowetting display device in accordance with first embodiment of the invention comprises a first substrate 100. The first substrate 100 may be glass, polymer substrate or metal. In one embodiment, the first substrate 100 is a flexible substrate, such as poly(ethyleneterephthalate) (PET), polyethylenenaphthalate (PEN), polycarbonate (PC), polyethersulfone (PS) or polyimide (PI).

A first electrode 102 is formed on the first substrate 100, wherein the first electrode 102 comprises metal or oxide, such as alumni, silver, indium tin oxide (ITO), molybdenum tungsten (MoW) or indium zinc oxide (IZO).

A dielectric layer 104 is formed on the first electrode 102, wherein the dielectric layer 104 comprises silicon oxide, silicon nitride, silicon oxynitride, $Al_2O_3$, $Ta_2O_3$, $TiO_2$, $BaTiO_3$, polyvinylidene difluoride (PVDF), parylene or combinations thereof.

A plurality of ribs 106 are formed on the dielectric layer 104, wherein the function of the ribs 106 is to divide a non-polar solution 110 to define a scope of pixel. The ribs 106 comprise positive photoresist, negative photoresist, photosetting resin or thermosetting resin. The thickness of ribs 106 is about 1 to 50 μm, preferably about 10 to 30 μm. Further, the ribs 106 preferably have a refractive index the same with that of a polar solution 206 to prevent color interference caused by a refraction phenomenon from a top view.

A hydrophobic layer 108 is formed on the dielectric layer 104 and between the ribs 106, wherein the hydrophobic layer 108 comprises fluoro-containing polymer, diamond-like carbon film or self-assembly silane. For example, fluoro-containing polymer comprises Teflon AF-1600 (Dupont), "Cytop" (ASAHI Glass CO., LTD) or "Cytonix" (Cytonix corporation). The self-assembly silane comprises octadecyl trichlorosilane (OTS), 3,3,3-trifluoro-propylmethyl dichlorosilane (PMDCS), tridecafluoro-1,1,2,2-tetrahydrooctyl trichlorosilane (FOTS), heptadecafluoro-1,1,2,2-tetrahydrodecyl trichlorosilane (FDTS), dodecyl trichlorosilane (DDTCS), dimethyldichlorosilane (DDMS), vinylundecyl trichlorosilane (V11TCS), or aminopropyl trimethoxysilane (APTMS).

Note that in prior art, the hydrophilic ribs were often formed on the hydrophobic layer to define the pixel, but poor adhesion existed due to the large polarity difference between the ribs and the hydrophobic layer, especially for flexible displays. Thus, products made thereby were less reliability and large area fabrication was difficult to achieve. The hydrophobic layer 108 of the invention is formed after forming the ribs 106, such that the hydrophilic ribs 106 are formed on the dielectric layer 104. Therefore, there is good adhesion between the ribs 106 and the dielectric layer 104 because the polarity of ribs 106 is close to that of the dielectric layer 104.

A second substrate 200 is provided, aligned to the first substrate 100. The second substrate 200 may be glass, polymer substrate or metal. In one embodiment, the first substrate 200 is a transparent substrate. In another embodiment, the second substrate 200 is a flexible substrate, such as poly (ethyleneterephthalate) (PET), polyethylenenaphthalate (PEN), polycarbonate (PC), polyethersulfone (PS) or polyimide (PI).

A second electrode 202 is formed on the second substrate 200, wherein the material of the second electrode 202 may be the same as that of the first electrode 102. A plurality of supporting members 204 are formed on the second electrode 202, and aligned to the ribs 106 to form an enclosed space. The supporting members 204 comprise positive photoresist, negative photoresist, photosetting resin or thermosetting resin. The thickness of supporting members 204 is about 5 to 50 μm, preferably about 10 to 40 μm. Further, the supporting members 204 preferably have a refractive index the same with a polar solution 206 to prevent color interference caused by the refraction phenomenon from a top view.

Note that the supporting members 204 on the second substrate 200 are aligned to the position of ribs 106 to form an enclosed space. Thus, the overflow problem of the non-polar solution can be prevented by the enclosed space, especially when the flexible substrates 100, 200 are used.

A non-polar solution 110 and the polar solution 206 are disposed in the enclosed space, wherein the non-polar solution 110 is separated by the ribs 106. The non-polar solution 110 comprises silicon oil, $C_{10}$-$C_{16}$ alkane (such as decane, dodecane, tetradecane or hexadecane), dye or pigment. The polar solution 206 comprises water, aqueous solutions or alcohols. Further, an electrolyte (such as KCl, NaCl or Sodium dodecyl sulfate (SDS)) may be added into the polar solution 206 to increase the ion conductivity. Additionally, a surfactant may also be added into the polar solution 206 to decrease the surface tension thereof. In one embodiment, the height of the non-polar solution 110 is about 1 to 50 μm, preferably about 2 to 20 μm, and the height of the polar solution 206 is about 10 to 200 μm, preferably about 20 to 50 μm.

Figure 2:
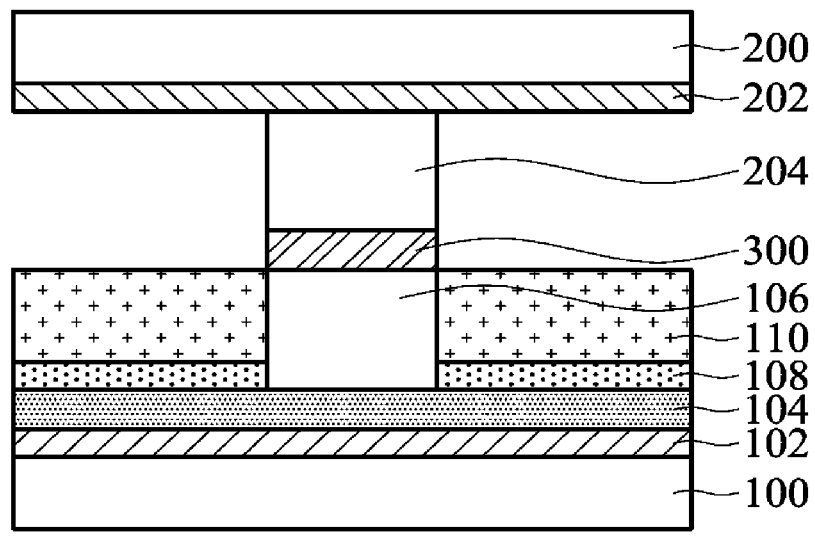
FIG. 2 shows a cross-sectional schematic representation of an electrowetting display in accordance with a second embodiment of the invention.

Referring to FIG. 2, an electrowetting display device in accordance with another embodiment of the invention is shown. Some structures have been omitted for clarity and like elements are identified by the same reference numbers as in FIG. 1. The only difference between FIG. 1 and FIG. 2 is that an additional adhesive layer 300 is formed between the ribs 106 and supporting members 204. The purpose of adhesive layer 300 is to increase adhesion between the ribs 106 and supporting members 204, wherein the adhesive layer 300 comprises photo-curing adhesive, pressure-curing adhesive or water-curing adhesive.

Figure 3:
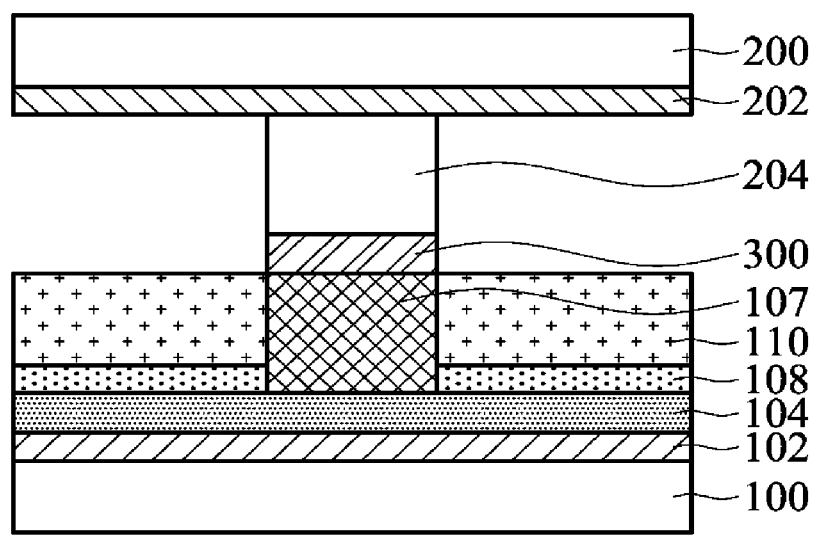
FIG. 3 shows a cross-sectional schematic representation of an electrowetting display in accordance with a third embodiment of the invention.

FIG. 3 shows an electrowetting display device in accordance with a third embodiment of the invention. Like elements are identified by the same reference numbers as in FIG. 2. The only difference between FIG. 2 and FIG. 3 is that the rib 107 is a light shielding material for high contrast displaying. In one embodiment, a black matrix is used as a light shielding material.

Figure 4A:
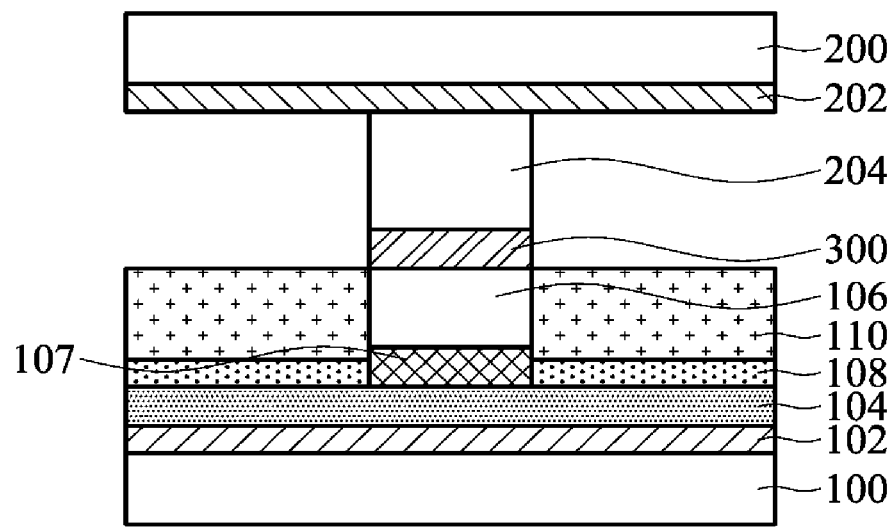
FIGS. 4A-4D show a cross-sectional schematic representation of an electrowetting display in accordance with a fourth embodiment of the invention.
Figure 4B:
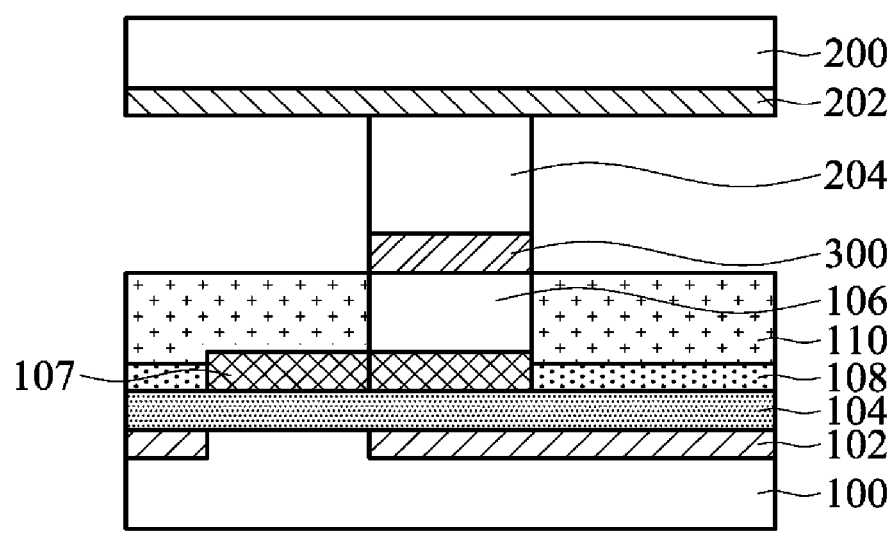
Figure 4C:
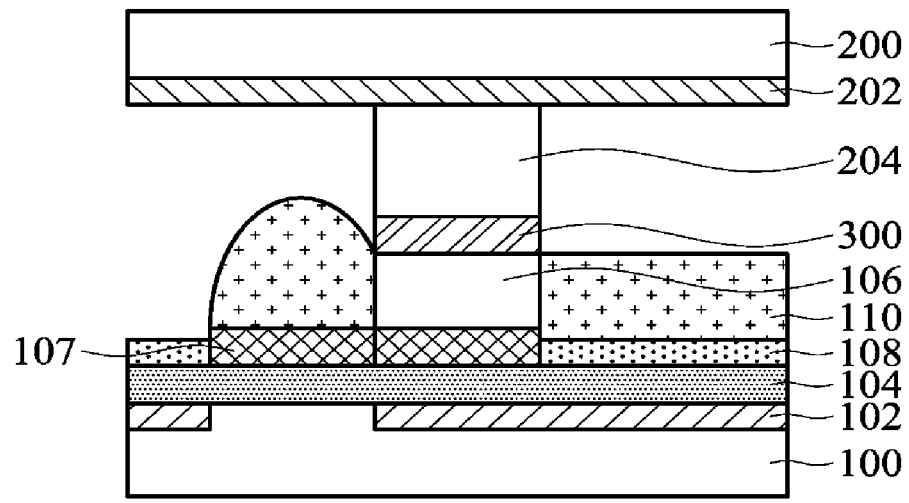
Figure 4D:
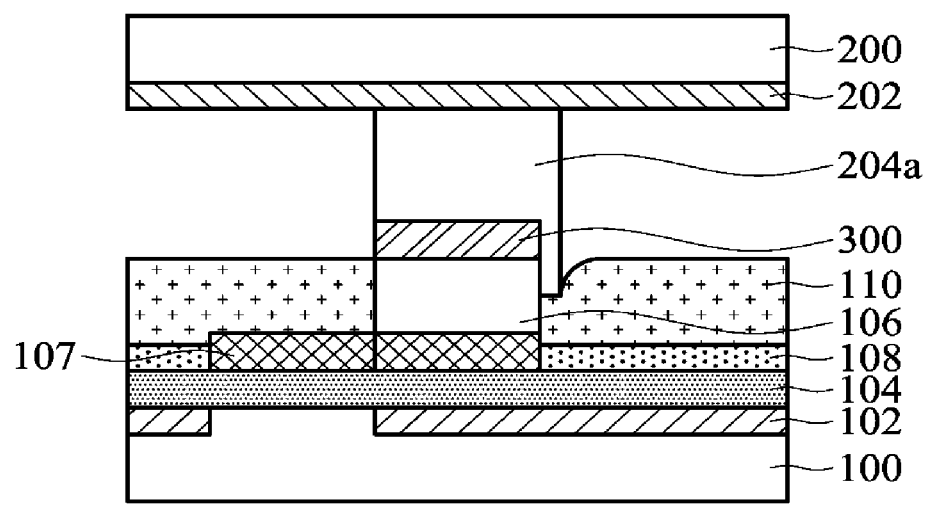

FIG. 4A shows an electrowetting display device in accordance with a forth embodiment of the invention. The main feature of this embodiment is that a light shielding material 107 is disposed between the ribs 106 and dielectric layer 104, wherein the height of the light shielding material is about 0.1 to 10 μm. Referring to FIG. 4B, the light shielding material 107 also extends outside of the ribs 106, wherein an empty region in the electrode 102 is directly below the light shielding material 107. Referring to FIG. 4C, when a voltage is applied to the electrode 102, there is no charge distributed in the empty region, and thus the non-polar solution 110 is repealed to the empty region. Therefore, display contrast is improved by shrinking the non-polar solution 110 to a region that the light shielding material 107 occupies. Referring to FIG. 4D, the supporting members 204a have an extending member which protrudes downward from the side wall of the ribs 106. The non-polar solution 110 near the extending member is repelled by the hydrophilic extending member of the supporting members 204a to form an arc position. Therefore, the non-polar solution 110 shrinks from the arc position when a voltage is applied to the electrode 102. Note that the extending member also be applied to FIG. 1, 2 or 3.

Figure 5A:
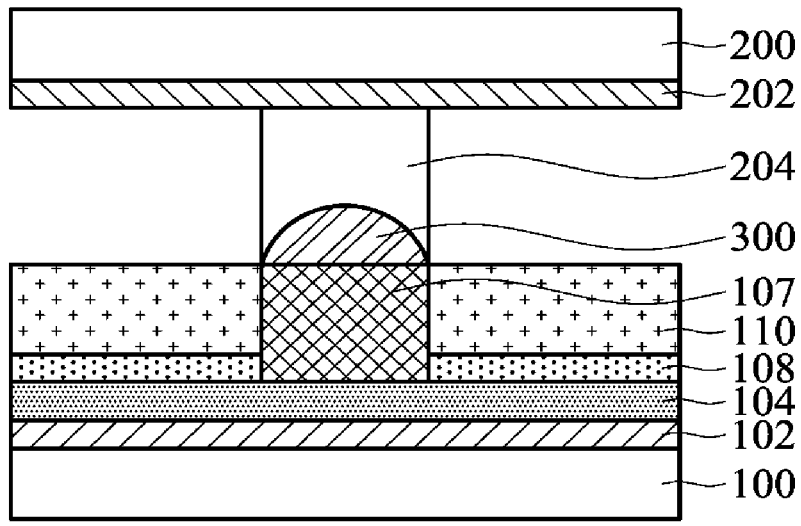
FIGS. 5A-5B show a cross-sectional schematic representation of an electrowetting display in accordance with a fifth embodiment of the invention.
Figure 5B:
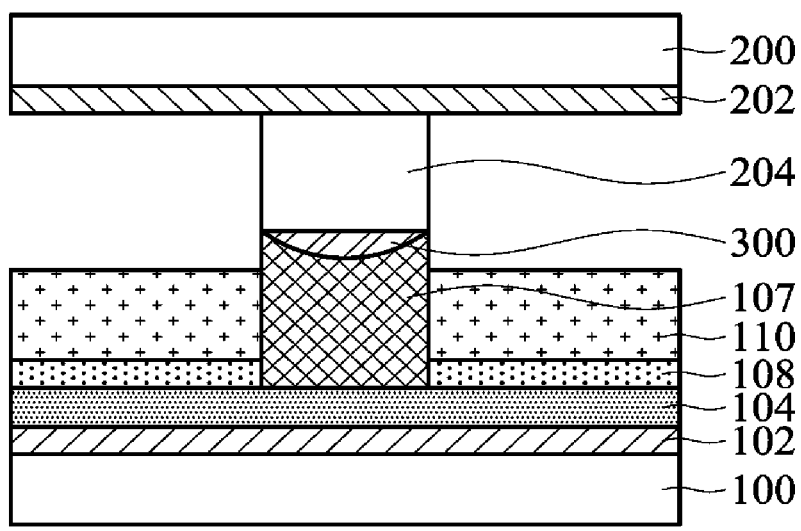

FIG. 5A shows an electrowetting display device in accordance with a fifth embodiment of the invention. The main feature of the fifth embodiment is that the supporting members 204 have a concave upper surface to accommodate the adhesive layer 300. Further, referring to FIG. 5B, the light shielding material may also have a concave upper surface to accommodate the adhesive layer 300.

Figure 6:
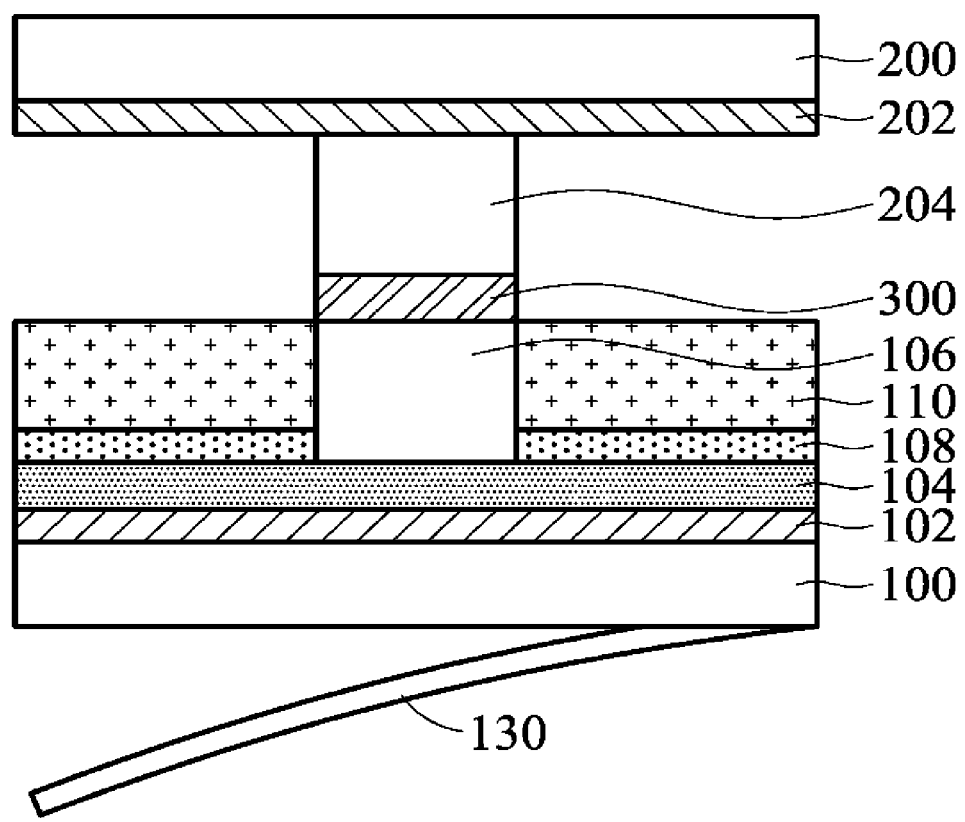
FIG. 6 shows a cross-sectional schematic representation of an electrowetting display in accordance with a sixth embodiment of the invention.

FIG. 6 shows an electrowetting display device in accordance with a sixth embodiment of the invention. The main feature of the sixth embodiment is that outside of the first substrate 100 further comprises glue adhesive. The display may be adhered to anywhere on wall or desk to improve display convenience.

Figure 7A:
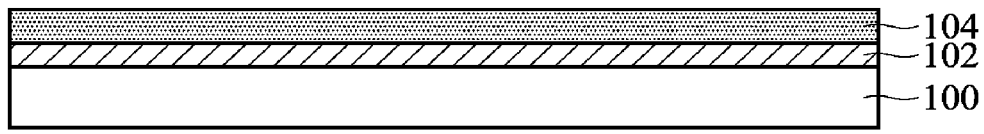
FIGS. 7A-7D show a cross-sectional schematic representation for fabricating an electrowetting display in accordance with a first embodiment of the invention.
Figure 7B:
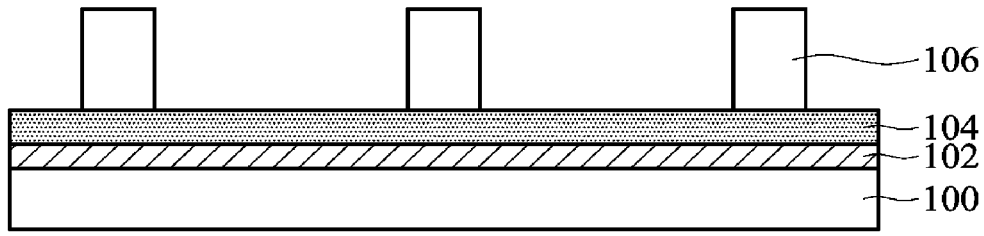

The invention also provides a method for fabrication an electrowetting display. FIG. 7A to FIG. 7B show a series of cross-sectional views of an intermediate stage of fabricating the electrowetting display of the invention. The first substrates 100 and the second substrate 200 are firstly provided. The substrates 100 and 200 can be simultaneously, respectively, or sequentially processed before being oppositely disposed. If the substrates 100 and 200 are sequentially processed, those skilled in the art can determine the particular processing sequence as required.

Then, referring to FIG. 7A, the first electrode 102 is formed on the first substrate 100 by a method including electrodepositing or sputtering methods. Next, the dielectric layer 104 is formed on the electrode 102 by a method including a chemical vapor deposition, atomic layer deposition (ALD), spin-coating or other various methods known in the art.

Referring to FIG. 7B, a plurality of ribs 106 are directly formed on the dielectric layer 104 by a method including photolithography, molding, reverse printing, or stencil printing methods. In one embodiment, when processed by a photolithography process, a material layer of the rib 106 is completely formed overlying the dielectric layer 104, followed by formation of a resist layer (not shown) thereon. After conventional exposing and developing steps, the resist layer becomes an etch mask. The material layer not covered by the etch mask is removed by a method such as etching, and then the etch mask is removed, thereby forming the ribs 106. In another embodiment, a material layer of the rib 106 is completely formed overlying the dielectric layer 104, followed by a conventional photolithography process to form the ribs 106. In yet another embodiment, when processed by molding, the substrate 100 is disposed in a previously fabricated mold, selectively forming the ribs 106 as described above, overlaying predetermined positions of the dielectric layer 104 by a technology such as injection molding.

Figure 7C:
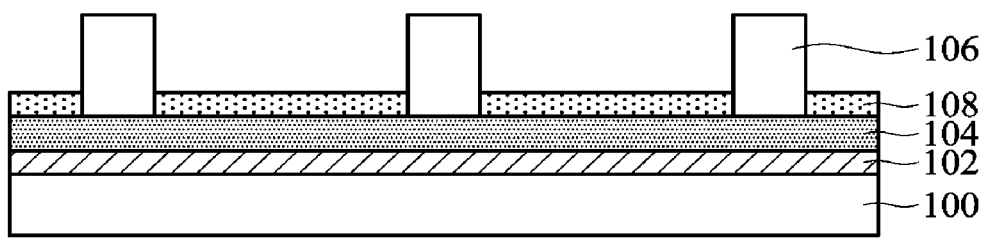

Next, referring to FIG. 7C, the hydrophobic layer 108 is formed on the dielectric layer 104 and between the ribs 106. The hydrophobic layer 108 is formed by subjecting the dielectric layer 104 and the ribs 106 to a surface treatment, wherein the surface treatment is such as a plasma, vapor deposition, sputtering or immersion surface treatment. Then, fluoro-containing polymer or self-assembly silane is formed on the dielectric layer 104 or ribs 106 to form the hydrophobic layer 108. Note that the fluoro-containing polymer or self-assembly as mentioned above can be omitted.

In one embodiment, the dielectric layer 108 can be silicon oxide, and the ribs can be PMMA resin. When performing an oxygen plasma process to the surface of the first substrate 100, dense OH-groups are formed on the dielectric layer 108, but less OH-groups are formed on the ribs 106. Next, the first substrate 100 having the electrode 102, ribs 106 and dielectric layer 108 is immersed into a solution with octadecyl trichlorosilane (OTS). Thus, an octadecyl trichlorosilane (OTS) is self-assembled to the dense OH-group of the surface of the dielectric layer 104 and the terminal $CH_3$-group of OTS is exposed to form the hydrophobic layer 108. Note that performing an oxygen plasma process to different materials may cause the surface of the materials to present different properties. Thus, the density of the self-assembled silane and the hydrophobic character of the hydrophobic layer may be further affected by controlling the experimental parameters of the oxygen plasma process.

Note that in prior art, the hydrophilic ribs were often formed on the hydrophobic layer to define the pixel, but poor adhesion problems existed due to the large polarity difference between the ribs and the hydrophobic layer, especially for flexible display. The ribs 106 of the invention are formed before forming the hydrophobic layer 108, such that the hydrophilic ribs 106 are formed on the dielectric layer 104. Therefore, there is good adhesion between the ribs 106 and the dielectric layer 104 because the polarity of ribs 106 is close to that of the dielectric layer 104.

Figure 7D:
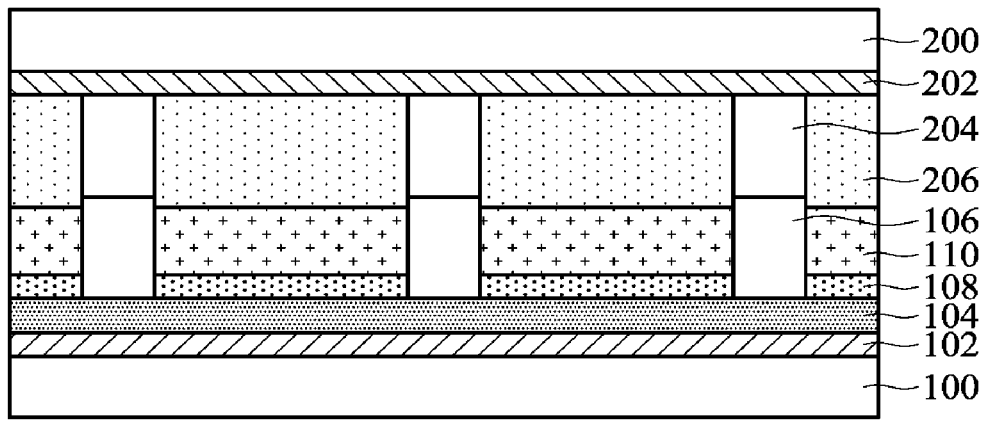

Further, the second electrode 202 is formed on the second substrate 200, and then the supporting members 204 are formed on the second electrode 202. Referring to FIG. 7D, the non-polar solution 110 is introduced between the ribs 106, and the polar solution 206 is introduced between the first substrate 100 and second substrate 200. The non-polar solution 110 or the polar solution 206 is introduced by a method such as a spin coating, bar coating, dip coating, roll coating, spray coating, gravure coating, ink jet printing, slot coating or blade coating method.

In one embodiment, the first substrate 100 and the second substrate 200 are combined in the polar solution 206 such that the ribs 106 are aligned to the supporting members 204 to form an enclosed space to prevent the overflow problem of the non-polar solution 110.

In order to facilitate the combination of the first substrate 100 and the second substrate 200, an adhesive layer (not shown) is further formed on the ribs 106 or supporting members 204. The adhesive layer is formed by a method such as a transfer printing, ink jet printing or photolithography method. Further, the ribs 106 or the supporting members 204 can have a concave upper surface (not shown) to accommodate the adhesive layer.

The main feature of the fabrication method of the invention is that the ribs 106 are directly formed on the dielectric layer 104, and thus adhesion is improved. Additionally, after forming the ribs 106, the dielectric layer 104 is subjected to a surface treatment to make the surface of the dielectric layer 104 to have hydrophilic groups to facilitate forming of the hydrophobic layer 108 in a sequential step, wherein the surface treatment is such as plasma, vapor deposition, sputtering or immersion surface treatment. In one embodiment, after forming the ribs 106, OH-groups are formed on the surface of the dielectric layer 104 by an oxygen plasma process, then the hydrophobic layer 108 is formed on the dielectric layer 104 by immersing the first substrate 100 having electrode 102, ribs 106 and dielectric layer 104 into the solution containing the OTS.

Additionally, after forming the supporting members 204, the supporting members 204 are subjected to the surface treatment, so that the surface of the supporting members 204 have the hydrophilic groups to help adhesion of the polar solution 206, and further prevent overflow of the non-polar solution 110.

Figure 8A:
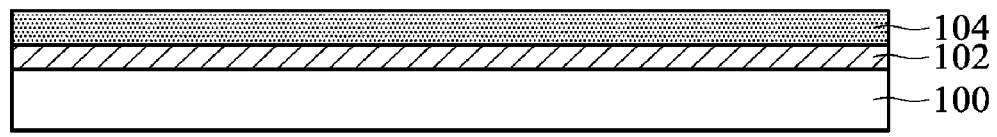
FIGS. 8A-8C and 9A-9E show a cross-sectional schematic representation for fabricating an electrowetting display in accordance with a second embodiment of the invention.
Figure 8B:
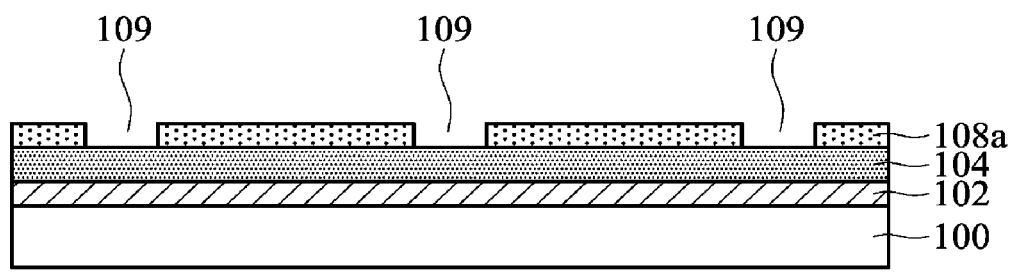
Figure 8C:
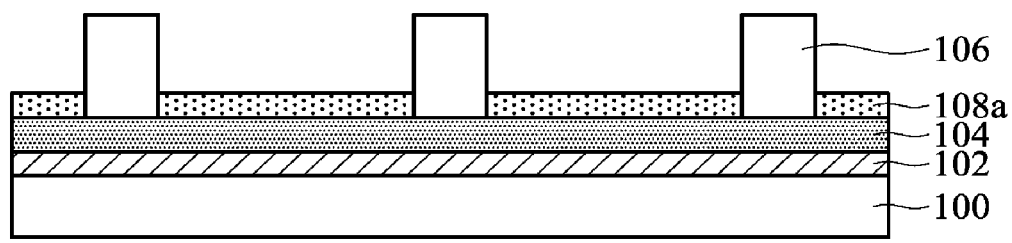

FIG. 8A to FIG. 8C shows the fabricating method for electrowetting display device in accordance with another embodiment of the invention. Firstly, the first electrode 102 is formed on the first substrate 100, and the dielectric layer 104 is formed on the electrode 102, wherein the material and fabrication methods of the first electrode 102 and the dielectric layer 104, are as described above, thus repeated descriptions are omitted.

Referring to FIG. 8B, a patterned hydrophobic layer 108a is formed on the dielectric layer 104, wherein the patterned hydrophobic layer 108s has a plurality of openings 109 and the openings 109 expose the dielectric layer 104.

Referring to FIG. 8C, the ribs 106 are formed on the openings 109, and then processes as described in FIG. 7D are performed. Note that because the openings 109 expose the dielectric layer 104, the ribs are formed on the dielectric layer 104. Thus, the poor adhesion problem between the ribs and hydrophobic layer in prior art is mitigated.

Figure 9A:
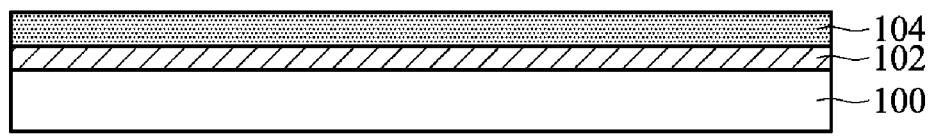
Figure 9B:
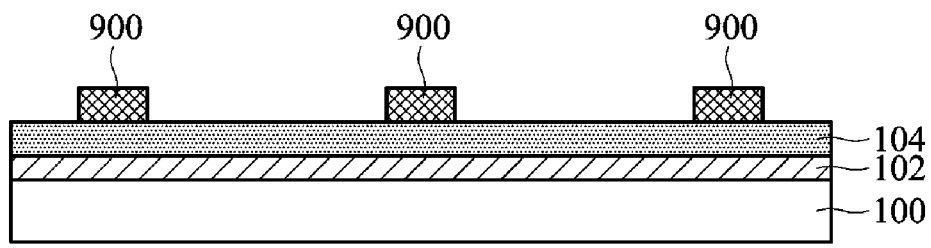

In one embodiment, a method for forming the patterned hydrophobic layer 108a is provided, as shown in FIG. 9A-FIG. 9E. Referring to FIG. 9A, the first electrode 102 is formed on the first substrate 100, and then the dielectric layer 104 is formed on the electrode 102. Referring to FIG. 9B, a patterned photoresist 900 is formed on the dielectric layer 104 by a method such as a photolithography method.

Figure 9C:
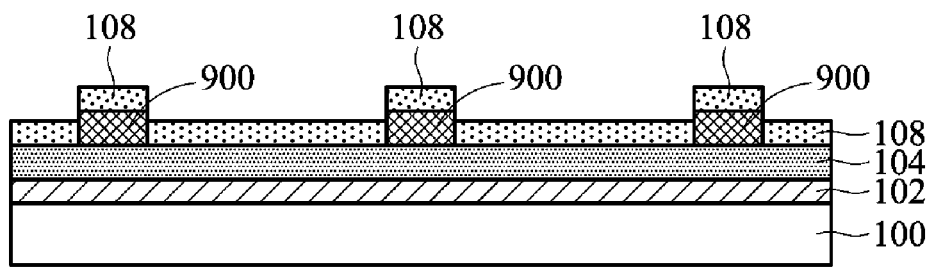
Figure 9D:
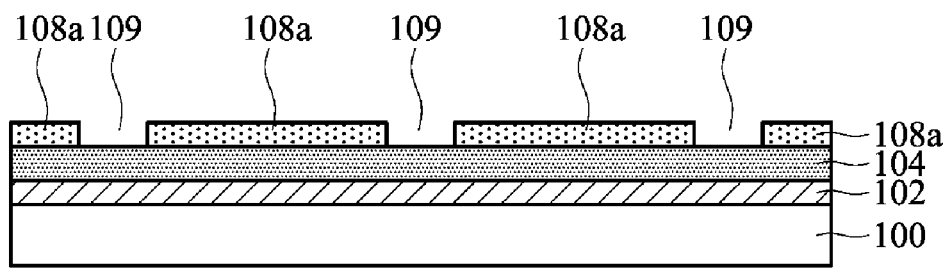
Figure 9E:
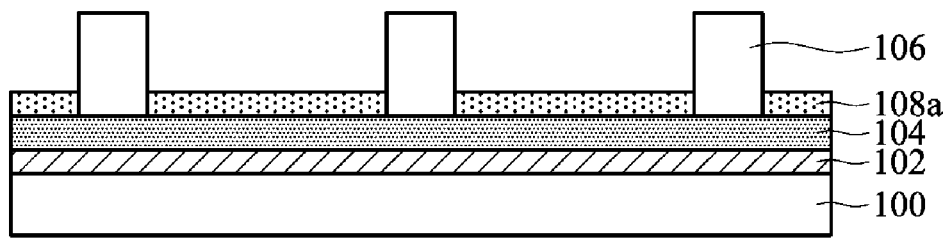

Next, referring to FIG. 9C, the hydrophobic layer 108 is formed on the patterned photoresist 900 and the dielectric layer 104. Referring to FIG. 9D, a patterned hydrophobic layer 108a is formed by removing the patterned photoresist 900, wherein the patterned hydrophobic layer 108a has a plurality of openings 109, and the openings 109 expose the dielectric layer 104. Referring to FIG. 9E, the ribs 106 are formed on the openings 109, and then processes as described in FIG. 7D are performed.

In another embodiment, forming the patterned hydrophobic layer 108a is by a printing method. Firstly, a lenticular module is provided. The hydrophobic layer 108 is adhered to the lenticular module by transfer printing, and then the hydrophobic layer 108 is printed to the dielectric layer 104. However, the method for forming the patterned hydrophobic layer is not limited to the disclosed embodiments. It is understood that other methods for forming the patterned hydrophobic layer are intended to be included within the scope of the invention.

The electrowetting display of the invention has the following advantages:

(1) The hydrophilic ribs are formed on the dielectric layer to improve adhesion between the dielectric layer and the ribs, and further improve reliability of displays made thereby.

(2) The enclosed space is formed by the ribs and the supporting members to prevent the overflow problem of the non-polar solution.

(3) In order to enhance the adhesion between the ribs and supporting members, the ribs or supporting members have a concave upper surface to accommodate the adhesive layer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrowetting display, comprising:
a first substrate;
a first electrode formed on the first substrate;
a dielectric layer formed on the first electrode;
a plurality of ribs formed on the dielectric layer;
a hydrophobic layer formed on the dielectric layer and between the ribs;
a second substrate disposed oppositely to the first substrate;
a second electrode formed on the second substrate;
a plurality of supporting members formed on the second electrode and aligned to abut the top portion of the ribs to form an enclosed space; and
a polar solution and a non-polar solution disposed in the enclosed space.

2. The electrowetting display as claimed in claim 1, wherein each of the first substrate and second substrate comprises glass, polymer substrate or metal.

3. The electrowetting display as claimed in claim 1, wherein the polar solution comprises water, aqueous solutions or alcohols.

4. The electrowetting display as claimed in claim 1, wherein the non-polar solution comprises silicon oil, $C_{10}$-$C_{16}$ alkane, dye or pigment.

5. The electrowetting display as claimed in claim 1, wherein each of the first electrode and the second electrode comprises metal or oxide.

6. The electrowetting display as claimed in claim 1, wherein the dielectric layer comprises silicon oxide, silicon nitride, silicon oxynitride, $Al_2O_3$, $Ta_2O_3$, $TiO_2$, $BaTiO_3$, polyvinylidene di fluoride (PVDF), parylene, or combinations thereof.

7. The electrowetting display as claimed in claim 1, wherein the ribs comprise positive photoresist, negative photoresist, photosetting resin or thermosetting resin.

8. The electrowetting display as claimed in claim 1, wherein the hydrophobic layer comprises fluoro-containing polymer, diamond-like carbon film or self-assembly silane.

9. The electrowetting display as claimed in claim 8, wherein the self-assembly silane comprises octadecyl trichlorosilane (OTS), 3,3,3-trifluoro-propylmethyl dichlorosilane (PMDCS), tridecafluoro-1,1,2,2-tetrahydrooctyl trichlorosilane (FOTS), heptadecafluoro-1,1,2,2-tetrahydrodecyl trichlorosilane (FDTS), dodecyl trichlorosilane (DDTCS), dimethyldichlorosilane (DDMS), vinylundecyl trichlorosilane (V11TCS), or aminopropyl trimethoxysilane (APTMS).

10. The electrowetting display as claimed in claim 1, wherein the ribs are light shielding material.

11. The electrowetting display as claimed in claim 1, further comprising a light shielding material between the ribs and the dielectric layer.

12. The electrowetting display as claimed in claim 11, wherein the light shielding material extends outside of the ribs.

13. The electrowetting display as claimed in claim 1, wherein the ribs have a thickness about 1 to 50 m.

14. The electrowetting display as claimed in claim 1, wherein the ribs have a concave upper surface.

15. The electrowetting display as claimed in claim 1, wherein the ribs have a refractive index the same with that of the polar solution.

16. The electrowetting display as claimed in claim 1, wherein the supporting members comprise positive photoresist, negative photoresist, photosetting resin or thermosetting resin.

17. The electrowetting display as claimed in claim 1, wherein the supporting members have a thickness about 5 to 50 m.

18. The electrowetting display as claimed in claim 1, wherein the supporting members have a concave upper surface.

19. The electrowetting display as claimed in claim 1, wherein the supporting members have a refractive index the same with that of the polar solution.

20. The electrowetting display as claimed in claim 1, wherein the supporting members have an extending member.

21. The electrowetting display as claimed in claim 1, further comprising an adhesive layer between the ribs and the supporting members.

22. The electrowetting display as claimed in claim 21, wherein the adhesive layer comprises photo-curing adhesive, pressure-curing adhesive or water-curing adhesive.

23. The electrowetting display as claimed in claim 1, further comprising a glue adhesive outside of the first substrate.

24. A method for fabricating an electrowetting display, comprising:
   providing a first substrate;
   forming a first electrode on the first substrate;
   forming a dielectric layer on the first substrate;
   forming a plurality of ribs directly on the dielectric layer;
   forming a hydrophobic layer on the dielectric layer and between the ribs;
   introducing a non-polar solution between the ribs;
   providing a second substrate;
   forming a second electrode on the second substrate;
   forming a plurality of supporting members on the second substrate;
   introducing a polar solution between the first substrate and the second substrate; and
   combining the first substrate and the second substrate such that the ribs are aligned to abut the bottom portion of the supporting members to form an enclosed space.

25. The method for fabricating an electrowetting display as claimed in claim 24, after forming the ribs, further comprising subjecting the dielectric layer to a surface treatment.

26. The method for fabricating an electrowetting display as claimed in claim 25, wherein the surface treatment comprises plasma, vapor deposition, sputtering or immersion.

27. The method for fabricating an electrowetting display as claimed in claim 24, wherein forming the hydrophobic layer comprises:
   subjecting the dielectric layer and the ribs to a surface treatment; and forming fluoro-containing polymer or self-assembly silane on the dielectric layer and the ribs.

28. The method for fabricating an electrowetting display as claimed in claim 27, wherein the surface treatment comprises plasma, vapor deposition, sputtering or immersion.

29. The method for fabricating an electrowetting display as claimed in claim 24, after forming the supporting members, further comprising subjecting the supporting members to a surface treatment.

30. The method for fabricating an electrowetting display as claimed in claim 29, wherein the surface treatment comprises plasma, vapor deposition, sputtering or immersion.

31. The method for fabricating an electrowetting display as claimed in claim 24, wherein the non-polar solution or polar solution is introduced by spin coating, bar coating, dip coating, roll coating, spray coating, gravure coating, ink jet printing, slot coating or blade coating.

32. The method for fabricating an electrowetting display as claimed in claim 24, before combining the first substrate and the second substrate, further comprising forming an adhesive layer on the ribs or the supporting members.

33. The method for fabricating an electrowetting display as claimed in claim 32, wherein the adhesive layer is formed by transfer printing, ink jet printing or photolithography.

34. A method for fabricating an electrowetting display, comprising:
   providing a first substrate;
   forming a first electrode on the first substrate;
   forming a dielectric layer on the first substrate;
   forming a patterned hydrophobic layer on the dielectric layer, wherein the patterned hydrophobic layer has a plurality of openings, and the openings expose the dielectric layer;
   forming a plurality of ribs on the openings;
   introducing a non-polar solution between the ribs;
   providing a second substrate;
   forming a second electrode on the second substrate;
   forming a plurality of supporting members on the second substrate;
   introducing a polar solution between the first substrate and the second substrate; and
   combining the first substrate and the second substrate such that the ribs are aligned to abut the bottom portion of the supporting members to form a enclosed space.

35. The method for fabricating an electrowetting display as claimed in claim 34, wherein forming the patterned hydrophobic layer comprises:
   forming a patterned photoresist on the dielectric layer;
   forming a hydrophobic layer on the patterned photoresist and the dielectric layer; and
   removing the patterned photoresist to form the patterned hydrophobic layer.

36. The method for fabricating an electrowetting display as claimed in claim 34, wherein the patterned hydrophobic layer is formed by a printing method.

* * * * *